(12) United States Patent

Sasamoto et al.

(10) Patent No.: US 9,473,445 B2
(45) Date of Patent: Oct. 18, 2016

(54) COMMENT PROCESSING DEVICE, COMMENT PROCESSING METHOD, AND STORAGE MEDIUM

(71) Applicant: SHARP KABUSHIKI KAISHA, Osaka-shi, Osaka (JP)

(72) Inventors: Hirokazu Sasamoto, Osaka (JP); Makoto Sakuta, Osaka (JP); Takayuki Nagamatsu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 233 days.

(21) Appl. No.: 14/027,803

(22) Filed: Sep. 16, 2013

(65) Prior Publication Data

US 2014/0108569 A1    Apr. 17, 2014

(30) Foreign Application Priority Data

Oct. 16, 2012  (JP) ................ 2012-229091

(51) Int. Cl.
*G06F 15/16* (2006.01)
*H04L 12/58* (2006.01)

(52) U.S. Cl.
CPC ............ *H04L 51/32* (2013.01); *H04L 12/58* (2013.01)

(58) Field of Classification Search
None
See application file for complete search history.

(56) References Cited

U.S. PATENT DOCUMENTS

| 8,898,098 B1* | 11/2014 | Luechtefeld | G06Q 10/06 704/257 |
| 9,021,059 B2* | 4/2015 | Runstedler | G06F 15/16 709/203 |
| 2008/0189367 A1 | 8/2008 | Okumura | |
| 2010/0246784 A1* | 9/2010 | Frazier | H04L 65/1083 379/88.13 |
| 2010/0315482 A1* | 12/2010 | Rosenfeld | H04N 7/147 348/14.08 |
| 2011/0231240 A1* | 9/2011 | Schoen | G06Q 30/0242 705/14.41 |
| 2012/0209986 A1* | 8/2012 | Shah | G06Q 50/01 709/224 |
| 2013/0198296 A1* | 8/2013 | Roy | G06Q 10/107 709/206 |
| 2013/0212494 A1* | 8/2013 | Heiferman | G06Q 10/1095 715/753 |

FOREIGN PATENT DOCUMENTS

| JP | 2004-239950 A | 8/2004 |
| JP | 2008-191748 A | 8/2008 |
| JP | 2010-110864 A | 5/2010 |
| JP | 2010-186237 A | 8/2010 |

* cited by examiner

*Primary Examiner* — Viet Vu
*Assistant Examiner* — James Edwards
(74) *Attorney, Agent, or Firm* — Birch, Stewart, Kolasch & Birch, LLP

(57) ABSTRACT

The agent server of the present invention includes (i) a conversation monitoring section for monitoring, based on a conversation log saved in a family message board server, comments made by members belonging to a community, (ii) a status information collecting section for collecting status information of the community which information corresponds to (i) a specific member or a combination of specific members and (ii) a specific keyword or a combination of specific keywords which have been detected based on the conversation log, and (iii) a comment making section for outputting, to the server, a comment message which conforms to an event of the community which event is indicated by status information.

8 Claims, 9 Drawing Sheets

F I G. 3

| CONVERSATION LOG | | | |
|---|---|---|---|
| No | COMMENT MESSAGE | SPEAKER | POSTED DATE AND TIME |
| 1 | I'M HOME. | TARO | 2012 0801 15:30 |
| 2 | HI, DEAR. | MOTHER | 2012 0801 15:35 |
| 3 | CAN I GO OUT TO PLAY? | TARO | 2012 0801 15:37 |
| 4 | HAVE YOU FINISHED HOMEWORK? | MOTHER | 2012 0801 15:40 |
| : | : | : | : |

F I G. 4

| MEMBER | KEYWORD | COMMENT RULE ||||
|---|---|---|---|---|---|
| | | INFORMATION SOURCE | EXTRACTION ITEM | EVENT | COMMENT MESSAGE |
| MOTHER | MILK | REFRIGERATOR STOCK INFORMATION (HOME SERVER) | ARTICLE = MILK, STOCK | STOCK = EXIST | MILK IS LEFT. |
| | | | | STOCK = NONE | MILK HAS RUN OUT! |
| MOTHER | MILK and BUY | LOCAL RETAIL STORE INFORMATION (INFORMATION SUPPLYING SERVER) | ADVERTISED ARTICLE = MILK, STORE NAME, PRICE | THERE IS A STORE AT BARGAIN SALE OF MILK. | 'STORE NAME' IS NOW AT BARGAIN SALE! IT'S 'PRICE'! |
| MOTHER and TARO | SNACKS or CONFECTIONERY or DESSERT or SWEETS | REFRIGERATOR STOCK INFORMATION (HOME SERVER) | ARTICLE = CONFECTIONERY, STOCK | STOCK = EXIST | CONFECTIONERY IS IN REFRIGERATOR. |
| | | | | STOCK = NONE | CONFECTIONERY HAS RUN OUT! |
| MOTHER and TARO | HOMEWORK or STUDY | CALENDAR INFORMATION (HOME SERVER) | MEMBER = TARO, PLAN = *HOMEWORK(*, DATE | THERE IS A PLAN RELATING TO HOMEWORK ON 'DATE' | THE HOMEWORK SHOULD BE DONE BY 'DATE'! |
| FATHER and MOTHER and TARO | POOL and 'DATE' | WEATHER FORECAST INFORMATION (INFORMATION SUPPLYING SERVER) | WEATHER ON 'DATE' | WEATHER = FINE | THE DAY WILL BE FINE WEATHER. |
| | | | | WEATHER = CLOUDY | NOTE THAT THE DAY WILL BE CLOUDY! |
| | | | | WEATHER = RAINY | UNFORTUNATELY, THE DAY WILL BE RAINY!! |
| FATHER and MOTHER and TARO | POOL and TIME | POOL FACILITY INFORMATION (INFORMATION SUPPLYING SERVER) | OPENING TIME CLOSING TIME | OPENING TIME = 'ss:ss' CLOSING TIME = 'ee:ee' | THEY OPEN FROM 'ss:ss' TO 'ee:ee'. |
| .. | .. | .. | .. | .. | .. |

FIG. 5

| REFRIGERATOR STOCK INFORMATION ||
|---|---|
| ARTICLE | STOCK |
| MILK | NONE |
| EGG | NONE |
| CONFECTIONERY | EXIST |
| VEGETABLE JUICE | NONE |
| : | : |

FIG. 6

| LOCAL RETAIL STORE INFORMATION |||
|---|---|---|
| STORE NAME | ADVERTISED ARTICLE | PRICE |
| AA SUPERMARKET | MILK | *** YEN |
| BB STORE | EGG | xxx YEN |
| CC MART | VEGETABLE JUICE | nnn YEN |
| : | : | : |

F I G. 7

| CALENDAR INFORMATION | | |
|---|---|---|
| DATE | MEMBER | PLAN |
| ⋮ | ⋮ | ⋮ |
| SEPTEMBER 1ST | FATHER | GOLF |
| SEPTEMBER 2ND | MOTHER | LUNCH WITH FRIENDS |
| SEPTEMBER 3RD | | |
| SEPTEMBER 4TH | | |
| SEPTEMBER 5TH | | |
| SEPTEMBER 6TH | | |
| SEPTEMBER 7TH | TARO | SUBMIT HOMEWORK |
| SEPTEMBER 8TH | | |
| SEPTEMBER 9TH | | |
| ⋮ | ⋮ | ⋮ |

COMMENT PROCESSING DEVICE, COMMENT PROCESSING METHOD, AND STORAGE MEDIUM

This Nonprovisional application claims priority under 35 U.S.C. §119 on Patent Application No. 2012-229091 filed in Japan on Oct. 16, 2012, the entire contents of which is hereby incorporated by reference.

TECHNICAL FIELD

The present invention relates to a comment processing device and a comment processing method for managing a community or for supporting communications between members of the community with the use of an electronic conversation tool such as an electronic bulletin board or a chat. Further, the present invention also relates to (i) a control program of the comment processing device and (ii) a storage medium in which the control program is stored.

BACKGROUND ART

Conventionally, various kinds of electronic conversation tools have been widely used, as communication technologies have been developed and as communication services have been diversified. Examples of the electronic conversation tools encompass an electronic bulletin board, a chat, a blog, a short text posting site (such as TWITTER (Registered Trademark)), and an SNS (Social Networking Service). A user communicates with other users (e.g., talks with other users, forms a community, and transmits information) by utilizing such conversation tools with the use of a communication apparatus.

Moreover, in recent years, artificial intelligence technologies have also been developed, and there is a technique in which a computer (i.e., a personified agent) communicates with a human (e.g., see Patent Literatures 1 and 2).

CITATION LIST

Patent Literatures

[Patent Literature 1]
Japanese Patent Application Publication Tokukai No. 2010-186237 A (Publication date: Aug. 26, 2010)
[Patent Literature 2]
Japanese Patent Application Publication Tokukai No. 2010-110864 A (Publication date: May 20, 2010)

SUMMARY OF INVENTION

Technical Problem

However, according to the conventional configuration, the agent is to make a comment with the use of a conversation tool without considering attributes (such as a rank) of users (hereinafter, referred to as "member") participating in a community. Further, the agent does not take into consideration circumstances of the community itself to which the members belong.

Therefore, according to the conventional configuration, a current situation of the community is not reflected in comments made by the agent. This causes problems that (i) a conversation with members becomes unnatural and (ii) the agent makes a comment which is unsuitable for actual circumstances of the community.

The present invention is accomplished in view of the problems, and its object is to provide a comment processing device, a comment processing method, a control program of the comment processing device, and a storage medium in which the control program is stored, which make it possible to cause an agent to make a comment via a conversation tool while taking into consideration (i) attributes of members participating in a conversation and (ii) circumstances of a community so as to facilitate communications for maintaining a good condition of the community.

Solution to Problem

In order to attain the object, a comment processing device in accordance with an aspect of the present invention includes: a conversation monitoring unit configured to monitor comments, which are made by members belonging to a community, by obtaining a conversation log from a conversation mediation server that mediates a conversation carried out by the members with use of a communication terminal device; a status information collecting unit configured to collect status information, which (i) indicates an event relating to the community and (ii) is designated by being associated with a specific member and a specific keyword, in a case where the conversation monitoring unit has detected that the specific keyword has appeared in a conversation in which the specific member participates; and a comment making unit configured to output, to the conversation mediation server, a comment message which conforms to an event that (i) relates to the community and (ii) is indicated by status information collected by the status information collecting unit.

A comment processing method in accordance with an aspect of the present invention is a method for processing a comment carried out by a comment processing device, the method including the steps of: monitoring comments, which are made by members belonging to a community, by obtaining a conversation log from a conversation mediation server that mediates a conversation carried out by the members with use of a communication terminal device; collecting status information, which (i) indicates an event relating to the community and (ii) is designated by being associated with a specific member and a specific keyword, in a case where it is detected, in the step of monitoring comments, that the specific keyword has appeared in a conversation in which the specific member participates; and outputting, to the conversation mediation server, a comment message which conforms to an event that (i) relates to the community and (ii) is indicated by status information collected in the step of collecting status information.

Advantageous Effects of Invention

An aspect of the present invention brings about an effect of facilitating communications so that a good condition of a community can be maintained.

BRIEF DESCRIPTION OF DRAWINGS

FIG. 3 is a view illustrating a data structure and a concrete example of a conversation log stored in a conversation log storing section.

FIG. 4 is a view illustrating a data structure and a concrete example of a comment rule stored in a comment rule storing section.

FIG. 5 is a view illustrating a data structure and a concrete example of refrigerator stock information (status information) obtained from a home server.

FIG. 6 is a view illustrating a data structure and a concrete example of local retail store information (status information) obtained from an information supplying server.

FIG. 7 is a view illustrating a data structure and a concrete example of calendar information (status information) obtained from a home server.

DESCRIPTION OF EMBODIMENTS

Embodiment 1

Figure 1:
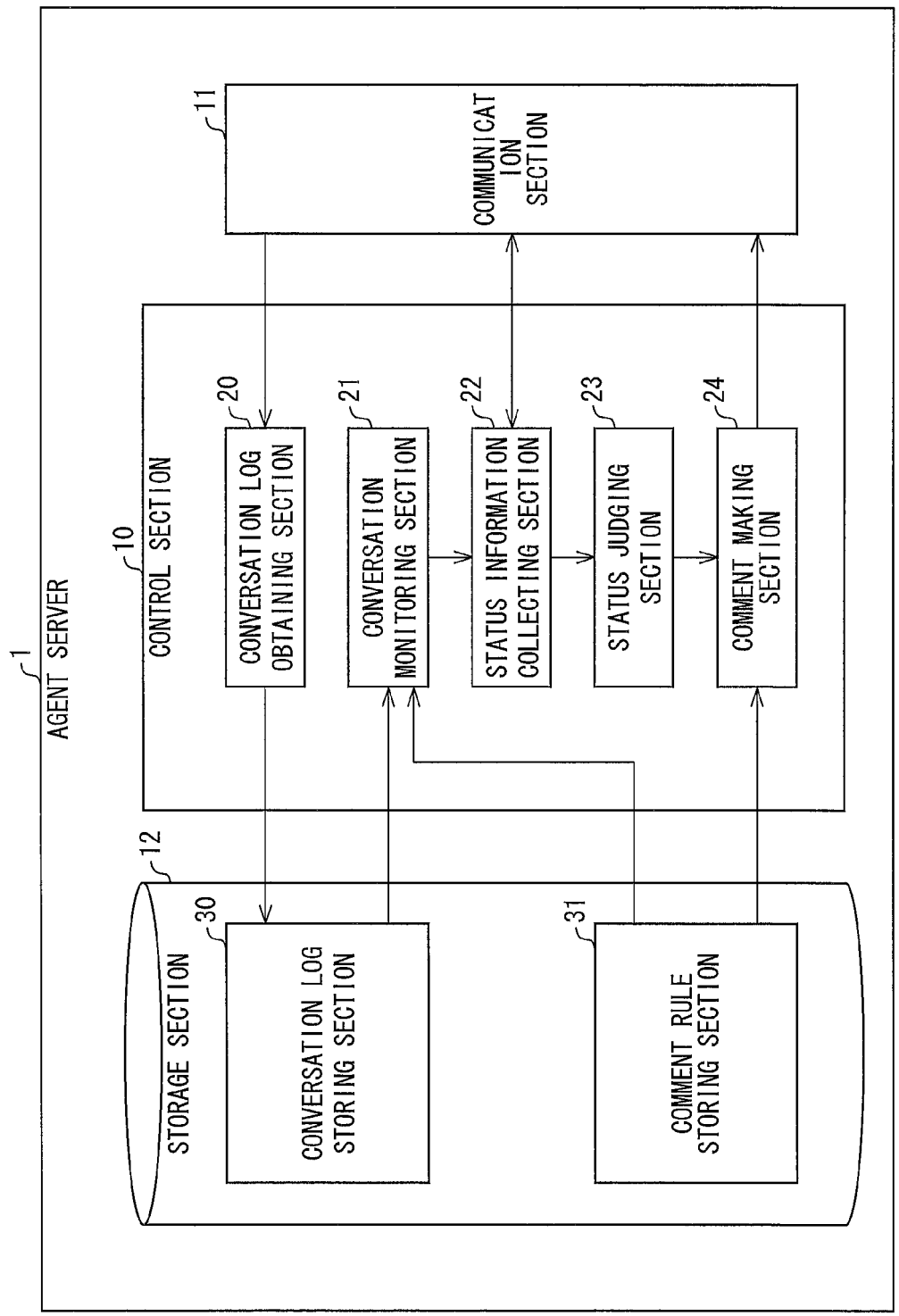
FIG. 1 is a block diagram illustrating an example configuration of main parts of an agent server in accordance with an embodiment of the present invention.

The following description will discuss an embodiment of the present invention with reference to FIGS. 1 through 10.

As an embodiment of the present invention, an example is described below in which a comment processing device of the present invention is applied to a family message board system. The family message board system is a communication system which is used by members of a community to have a conversation, with the use of their respective mobile terminals, via a family message board (electronic conversation tool) provided by a family message board server (conversation mediation server). One community is, for example, one family. Members of a family (community) are, for example, a father, a mother, and a child. The members can have a conversation with the use of a shared terminal such as a network television placed in a house or a tablet, other than their respective mobile terminals. The comment processing device of the present invention functions as the agent server in the family message board system. The agent server is a device which (i) personifies a household appliance, which operates in a house of the family, as a member of the family and (ii) is authorized to make a comment via the family message board of the family on behalf of the personified household appliance (hereinafter, referred to as "personified appliance"). The family message board system will be described later in detail.

Note that, in the descriptions below discussed with reference to the drawings, identical reference numerals are given to parts identical to each other or corresponding to each other, and explanations for such parts are not repeatedly made. Moreover, a dimensional relation such as a length, a size, and a width, and a shape in each of the drawings are altered as appropriate for clarifying and simplifying the drawings, i.e., the dimensions and the shapes depicted in the drawings are not actual ones.

[Overview of Family Message Board System]

Figure 2:
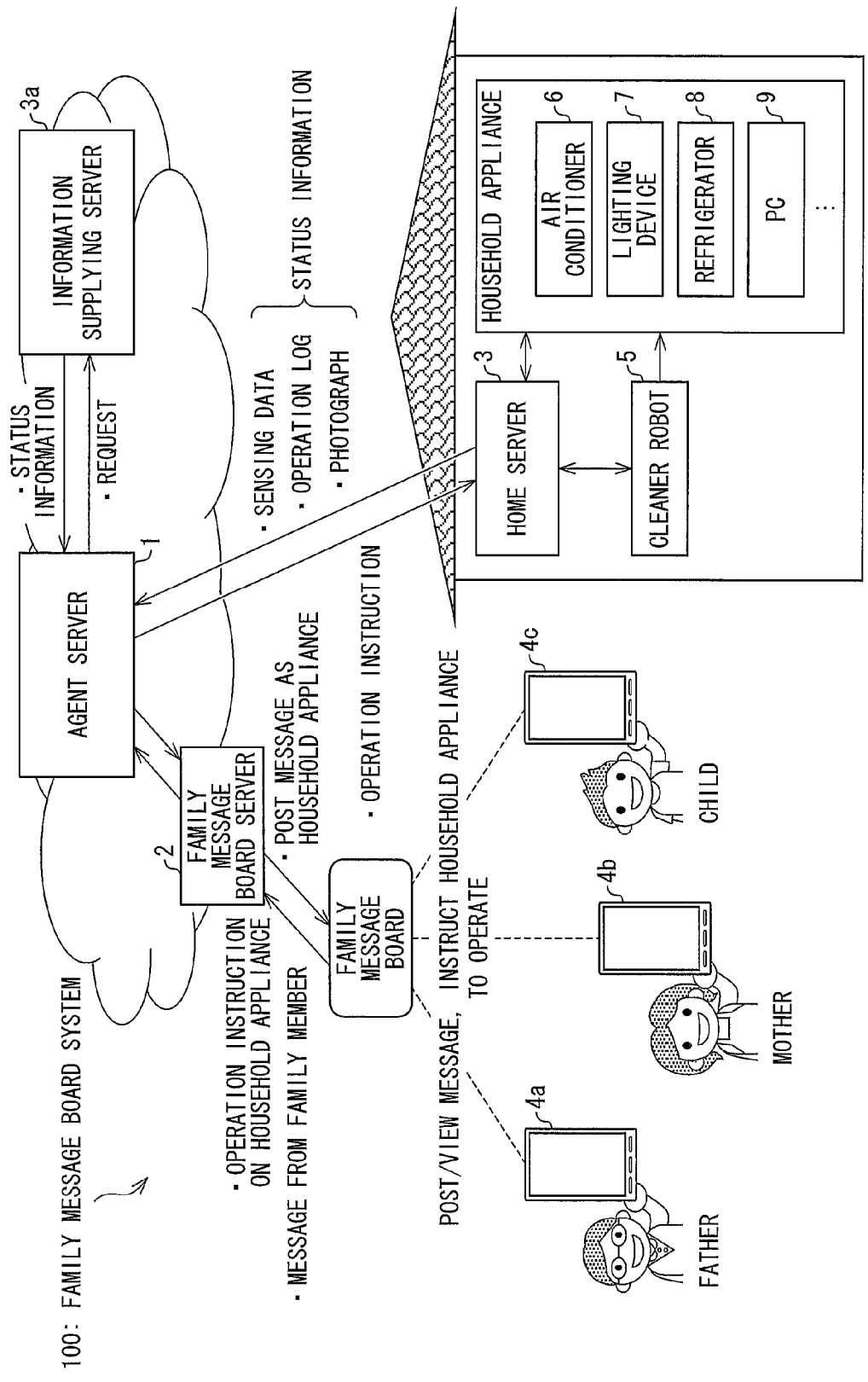
FIG. 2 is a view schematically illustrating a family message board system in accordance with an embodiment of the present invention.

The following description will schematically discuss a family message board system in accordance with an embodiment of the present invention, with reference to FIG. 2. FIG. 2 is a view schematically illustrating a family message board system 100.

The family message board system 100 is a system that provides an electronic message board which is used by registered members of a community so as to communicate with each other. In the family message board system 100, a personified appliance is to post a message on a family message board while taking into consideration (i) a status of an apparatus (hereinafter, referred to as "household appliance") placed in a house (community) or (ii) contents of messages posted by the members, etc. Further, in the family message board system 100, it is possible to control operations of household appliances including the personified appliance based on an instruction given by any of the members.

As illustrated in FIG. 2, the family message board system 100 includes an agent server 1, a family message board server 2, and a home server 3. The members (i.e., a father, a mother, and a child in the example illustrated in FIG. 2) of the family can access the family message board with the use of their respective mobile terminals 4a, 4b, and 4c. This allows each of the members to (i) post a message on the family message board, (ii) view the family message board, and (iii) give an instruction on operating a household appliance, with the use of his/her own mobile terminal. A cleaner robot 5 is connected with the home server 3 via a wireless communication. Further, other household appliances are connected with the home server 3 via wired or wireless communication connections. In the example illustrated in FIG. 2, the cleaner robot 5 is a personified appliance, and the other household appliances are an air conditioner 6, a lighting device 7, a refrigerator 8, and a PC (Personal Computer) 9. Note, however, that types of the household appliances and the number of the household appliances are not limited to particular ones. The household appliances can further encompass audio-visual equipment such as a television, a video recorder, and a speaker.

The agent server 1 posts a message on the family message board in accordance with (i) statuses of the household appliances, (ii) information obtained by the household appliances, and (iii) contents of messages posted by the members, etc. More specifically, the agent server 1 posts a message as a character created by personifying the cleaner robot 5. This allows the members of the family to experience a simulated communication with the cleaner robot 5 via the family message board.

The agent server 1 accepts operation instructions from the mobile terminals 4a, 4b, and 4c and transmits operation instructions, which correspond to the accepted instructions, to the home server 3 so as to control operations of the cleaner robot 5 or the other household appliances.

In the example discussed here, the agent server 1 has (i) a function to post a message on the family message board and (ii) a function to control operations of the cleaner robot 5 and the other household appliances. Note, however, that the two functions can be provided to respective different two servers.

The family message board server 2 carries out overall processes relating to the family message board. For example, the family message board server 2 (i) provides a display screen of the family message board to the mobile terminals 4a, 4b, and 4c and (ii) manages messages which are posted on the family message board.

The home server 3 comprehensively controls transmission and reception of information between (i) the cleaner robot 5 or any of the household appliances and (ii) the agent server 1. Specifically, the home server 3 controls an operation of the cleaner robot 5 or any of the household appliances in accordance with an operation instruction received from the agent server 1. Moreover, the home server 3 transmits, to the agent server 1, information obtained from the cleaner robot 5 and information obtained from the household appliances.

In the example illustrated in FIG. 2, the home server 3 transmits (i) sensing data obtained by a sensor provided in the cleaner robot 5 or any of the household appliances, (ii) an operation log of the household appliances, and (iii) a photograph taken by any of the household appliances. Note, however, that the information to be transmitted is not limited to such examples. The information thus collected in the house is supplied from the home server 3 to the agent server 1 as status information which is indicative of events in the community. The agent server 1 can grasp a status of the community (in this case, a status of the house or the family illustrated in FIG. 2) by utilizing the status information.

In a case where, for example, the comprehensive control is not needed, i.e., no household appliance exists which is involved in the family message board, it is possible to employ a configuration in which (i) the home server 3 is not provided and (ii) information is transmitted and received between the cleaner robot 5 and the agent server 1.

Each of the mobile terminals 4a, 4b, and 4c is a device for use in (i) viewing the family message board, (ii) posting a message on the family message board, and (iii) giving instructions on operating the cleaner robot 5 and the other household appliances. In the example illustrated in FIG. 2, each of the mobile terminals 4a, 4b, and 4c is configured by a smart phone. Note, however, that the mobile terminals 4a, 4b, and 4c are not limited to this, provided that the mobile terminals 4a, 4b, and 4c can be used to (i) view the family message board, (ii) post a message on the family message board, and (iii) give operation instructions. Hereinafter, the mobile terminals 4a, 4b, and 4c are collectively referred to as "mobile terminal 4", unless it is particularly necessary to distinguish the mobile terminals 4a, 4b, and 4c from each other.

The cleaner robot 5 is a self-propelled cleaner for automatically cleaning a floor. In addition to the function to carry out cleaning, the cleaner robot 5 has functions such as a function to store an operation log, a function to detect and output a remaining battery power, a function to capture an image, a function to recognize a voice, and a function to output a voice. Further, the cleaner robot 5 has a function to transmit a control signal to a household appliance so as to control the household appliance.

The air conditioner 6 is a device for conditioning air by, for example, cooling or heating the air. The air conditioner 6 includes a temperature sensor and transmits, to the home server 3, a room temperature detected by the temperature sensor.

The lighting device 7 includes a light source such as an LED. The lighting device 7 can be controlled to be turned on or off by the home server 3.

The refrigerator 8 is a storage for storing foods, etc. at an appropriate temperature. According to the present embodiment, the refrigerator 8 includes, for example, sensing apparatuses such as a camera, a weight sensor, and an IC tag reader. The refrigerator 8 has (i) a function to obtain, as status information, a stock status in the refrigerator 8 and (ii) a communication function to upload the status information to the home server 3.

The PC 9 is a so-called personal computer. The PC 9 can be (i) one PC 9 which is shared by the members of the family or (ii) a plurality of PCs 9 owned by the respective members. The PC 9 is configured by, for example, a desktop personal computer, a laptop computer, or a tablet PC. According to the present embodiment, the PC 9 contains an application for managing a schedule so that schedules of the members can be registered or read out with the use of the PC 9. Information (calendar information) of the schedules of the members inputted via the PC 9 is uploaded to the home server 3 as status information so as to be shared by the PC(s) 9, the mobile terminals 4a, 4b, and 4c, and the agent server 1.

The agent server 1 further has an information retrieving function to collect necessary information via the Internet. As illustrated in FIG. 2, the agent server 1 can access an information supplying server 3a connected with the Internet. Note that, although not illustrated, the agent server 1 is assumed to be configured also to access other information supplying servers 3b, 3c, and so forth. According to the present embodiment, the agent server 1 can grasp a status of an external environment surrounding the community (i.e., events caused in the external environment which can influence the family) by obtaining requested status information from the information supplying server 3a. The status information obtained from the information supplying server 3a is not limited to the information above described. For example, the status information is assumed to be (i) information on a retail store or a facility located near to the house of the family and (ii) weather forecast information of an area in which the members of the family are interested.

As such, in the family message board system 100, the agent server 1 (i) collects pieces of status information in relation to the community so as to grasp the status of the community and (ii) can post a message on the family message board while taking into consideration the status of the community, on behalf of the personified cleaner robot 5 which is the member of the community (family). This allows the members of the family to enjoy virtual communications with the cleaner robot 5 via the family message board, as if the cleaner robot 5 is an actual member of the family. Moreover, contents of the message posted by the cleaner robot 5 reflects the status of the community, and this makes it possible to prevent the cleaner robot 5 (i) from disturbing a flow of conversation carried out between the members of the community and (ii) from making a comment which is unsuitable for an actual status of the community. It is therefore possible (i) to further facilitate, by the comments made by the cleaner robot 5, communications between the members via the family message board, and accordingly (ii) to maintain a good condition of the community.

The following description will discuss a further detailed configuration of the agent server 1 for making a comment which reflects a status of a community.

[Configuration of Agent Server]

FIG. 1 is a block diagram illustrating an example configuration of main parts of the agent server 1.

The agent server 1 of the present embodiment includes a control section 10, a communication section 11, and a storage section 12 (see FIG. 1).

The communication section 11 is provided for the agent server 1 to communicate with an external apparatus. Specifically, the agent server 1 communicates with the family message board server 2, the home server 3, and the information supplying servers 3a, 3b, 3c, and so forth via the communication section 11.

The storage section 12 is a storage device in which various kinds of data, which are used by the agent server 1, are stored.

The storage section 12 non-transitorily stores (1) a control program, (2) an OS program, (3) application programs, and (4) various kinds of data. The control program and the OS program are executed by the control section 10 of the agent server 1. The application programs are executed by the control section 10 in order to carry out the functions of the agent server 1. The various kinds of data are read out when the application programs are executed.

The pieces of data (1) through (4) are stored in, for example, a nonvolatile storage device such as a ROM (read only memory), a flash memory, an EPROM (Erasable Programmable ROM), an EEPROM (Registered Trademark) (Electrically EPROM), or an HDD (Hard Disc Drive).

The agent server 1 can include a temporary storage section (not illustrated). The temporary storage section is a so-called working memory which temporarily stores data such as (i) data used in arithmetical operation carried out while the agent server 1 is executing various kinds of processes and (ii) results of the arithmetical operation. The temporary storage section is configured by a volatile storage device such as a RAM (Random Access Memory).

Which data is stored in which storage device is determined as appropriate in accordance with a factor such as an intended use of the agent server 1, convenience, cost, or a physical restriction.

The storage section 12 includes a conversation log storing section 30 and a comment rule storing section 31 (see FIG. 1).

The conversation log storing section 30 is configured to store a conversation log (write history) on the family message board.

The comment rule storing section 31 is configured to store a comment rule which indicates what kinds of comments should be made in accordance with events occurring in the community and outside of the community.

Note that the storage section 12 can include a status information storing section (not illustrated). The status information storing section is configured to store, for example, pieces of status information, which are collected from the home server 3, regarding the cleaner robot 5 and the other household appliances. In addition or alternatively, the status information storing section is configured to store pieces of status information, which are collected from the information supplying server 3a, regarding an external environment of the community.

The control section 10 comprehensively controls the functions of the agent server 1. The control section 10 includes, as functional blocks, a conversation log obtaining section 20, a conversation monitoring section 21, a status information collecting section 22, a status judging section 23, and a comment making section 24 (see FIG. 1).

The functional blocks of the control section 10 can be achieved by, for example, a CPU (central processing unit) which loads, into a RAM (random access memory) (not illustrated), a program stored in a storage device (storage section 12) configured by a ROM (read only memory) or by an NVRAM (non-volatile random access memory).

The conversation log obtaining section 20 collects information on a user of the family message board service. Specifically, the conversation log obtaining section 20 obtains a conversation log of the members of the family which is registered as one (1) community in the family message board server 2. Then, the conversation log obtaining section 20 causes the conversation log storing section 30 to store the conversation log thus obtained.

The conversation monitoring section 21 monitors a conversation log obtained by the conversation log obtaining section 20. Specifically, the conversation monitoring section 21 specifies, with reference to the conversation log, members who are participating in a conversation which is currently carried out. In a case where the participating members include a specific member or a combination of specific members, the conversation monitoring section 21 detects whether or not a specific keyword or a combination of specific keywords is included in comments made by the members. A combination of the specific member and the specific keyword, which is to be detected by the conversation monitoring section 21, is designated in the comment rule storing section 31 in advance. The comment rule stored in the comment rule storing section 31 will be described later in detail.

The status information collecting section 22 collects, from an external apparatus, status information on the community.

Specifically, the status information is information which (i) indicates an event in the community and (ii) is collected from the household appliances placed in the house of the family (community). The status information is saved in the home server 3. The status information collecting section 22 obtains necessary status information by sending, to the home server 3, a request for the necessary status information. The status information which is obtained by the status information collecting section 22 from the home server 3 is, more specifically, information such as refrigerator stock information and calendar information. Note, however, that the status information is not limited to those.

Alternatively, the status information is information on an external environment surrounding the house (community). The status information is saved by the information supplying server 3a. The status information collecting section 22 obtains necessary status information by sending, to the information supplying server 3a, a request for the necessary status information. The status information which is obtained from the information supplying server 3a is, more specifically, information such as local retail store information, weather forecast information, and pool facility information. Note, however, that the status information is not limited to those.

The status information collecting section 22 thus (i) obtains pieces of status information from inside and outside the community via the communication section 11 and (ii) causes a status information storing section (not illustrated) to store the pieces of status information. A data structure of the status information will be described later with reference to concrete examples.

Note that, according to the present embodiment, the status information collecting section 22 is configured to obtain designated status information from a specified information source (i.e., the home server 3 or the information supplying server 3a) which is associated, in advance, with (i) a specific member or a combination of specific members and (ii) a specific keyword or a combination of specific keywords which have been detected by the conversation monitoring section 21.

This makes it possible to obtain, at a desired timing, only necessary status information regarding (i) the members having a conversation and (ii) contents of the conversation.

The comment rule storing section 31 stores information that indicates which combination of specific member and specific keyword is associated with which information source and status information.

The status judging section 23 analyzes status information, which has been collected by the status information collecting section 22, so as to judge a status of the community. Specifically, the status judging section 23 specifies (i) things belonging to the community or (ii) an occur event (encompassing a currently occurring event, an event occurred in the past, and an event which will occur in the future) in the external environment relating to the community. The event specified by the status judging section 23 becomes one of conditions for specifying contents of a comment which the comment making section 24 is to make. In other words, the status judging section 23 specifies a condition necessary for retrieving contents of a comment made by the cleaner robot 5.

More specifically, the status judging section 23 extracts, in accordance with the comment rule, an item relating to the detected specific member or specific keyword out of the collected pieces of status information. Then, the status judging section 23 specifies, as a condition, an event indicated by the extracted item.

In a case where, for example, refrigerator stock information (status information) obtained from the refrigerator 8 contains information (item) on whether or not milk is stocked, the status judging section 23 judges, based on the item, whether or not milk is currently stocked in the refrigerator 8. In a case where, for example, the item, which is contained in the refrigerator stock information and is indicative of whether or not milk is stocked, indicates that milk is currently stocked in the refrigerator 8, the status judging section 23 specifies an event of the refrigerator 8 as "stock (of milk)=exist". The status judging section 23 notifies the comment making section 24 of the specified event as one of conditions for use in retrieval.

The comment making section 24 (i) specifies a content of a comment in accordance with a status of the community judged by the status judging section 23 and (ii) makes a comment containing the specified content. Specifically, the comment making section 24 obtains, with reference to the comment rule, a draft comment message which conforms to a condition (i.e., an event inside or outside the community) specified by the status judging section 23. The comment making section 24 completes a comment message by using the draft comment message as it is or by partially editing the draft comment message. Then, the comment making section 24 outputs the comment message, which has been thus completed, to the family message board server 2.

The comment message outputted by the comment making section 24 is posted on the family message board (see FIG. 2) as a message from the cleaner robot 5 so as to be viewed via the mobile terminals 4 of the respective members.

According to the present embodiment, the comment making section 24 specifies a content of a comment in accordance with retrieval conditions which also includes members participating in a conversation and a keyword which have been specified by the conversation monitoring section 21, in addition to the event specified by the status judging section 23.

[Conversation Log]

FIG. 3 is a view illustrating a data structure and a concrete example of a conversation log stored in the conversation log storing section 30. In FIG. 3, a conversation log is exemplified as having a data structure in a table format. Note, however, that the data structure of the conversation log is not limited to this. Hereinafter, the same applies to other drawings for explaining data structures.

Figure 9:
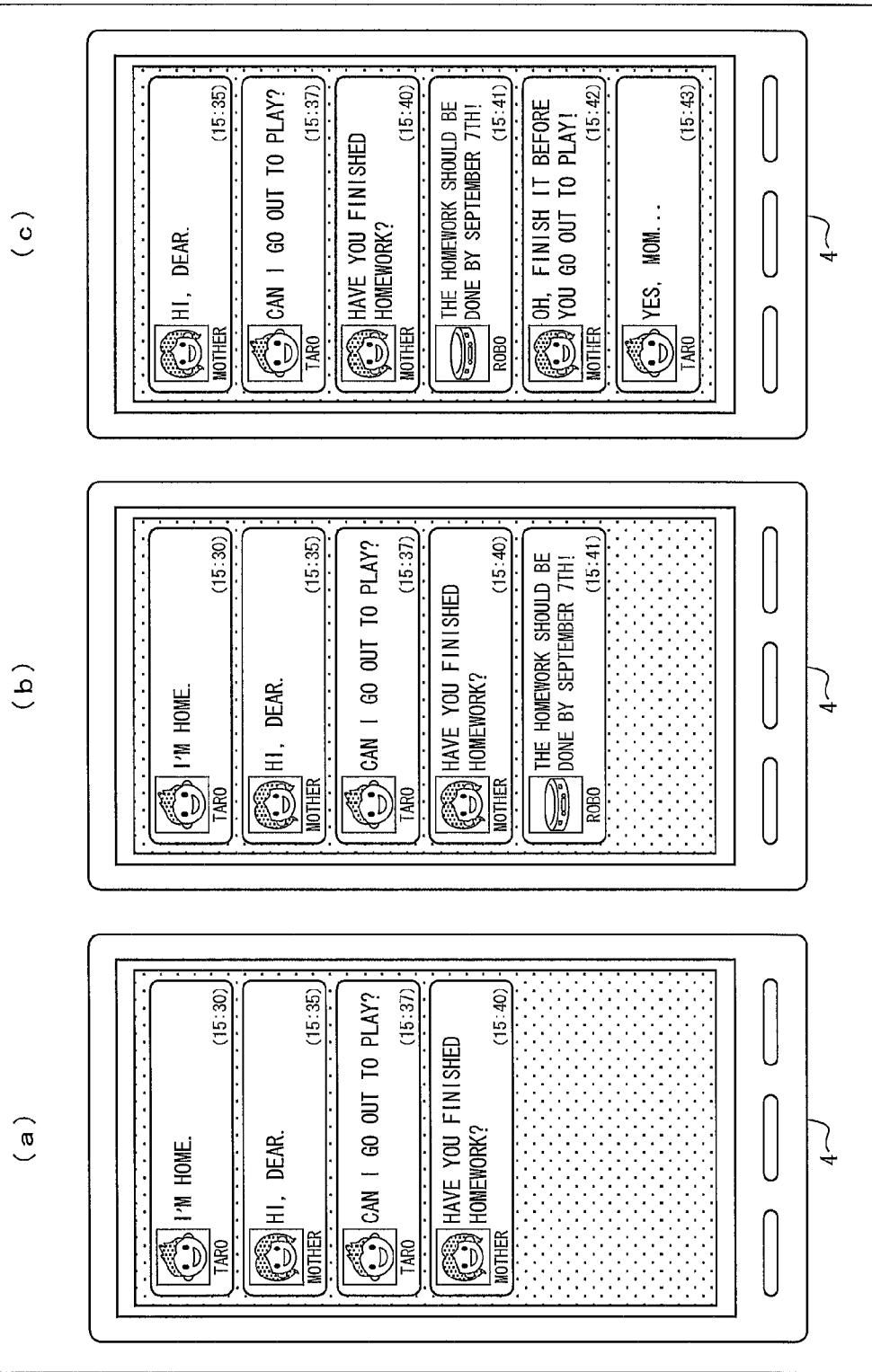
FIG. 9 is a view illustrating, in each of (a) through (c), an example screen of a family message board which is displayed on a mobile terminal of each member in a case where an agent server participates in a conversation.

The example of the conversation log illustrated in FIG. 3 corresponds to an example of a family message board screen illustrated in (a) of FIG. 9. Hereinafter, it is assumed that the father is expressed as "Father", the mother is expressed as "Mother", the child is expressed as "Taro", and the cleaner robot 5 is expressed as "Robo", as pieces of information indicative of a member who posted a message on the family message board displayed on the screen of the mobile terminal 4.

According to the example illustrated in (a) of FIG. 9, messages are posted by Taro and Mother at this time. That is, participants of a conversation established at this time are Mother and Taro.

The messages are recorded as a conversation log in the family message board server 2. The conversation log obtaining section 20 obtains the conversation log and then causes the conversation log storing section 30 to store the conversation log as the table illustrated in FIG. 3. In the example illustrated in FIG. 3, in a case where one (1) message is posted, the conversation log obtaining section 20 registers one (1) record in the table of the conversation log. The table of the conversation log has (i) a column of "comment message" for storing concrete contents of messages, (ii) a column of "speaker" for storing a member who posted the message, and (iii) a column of "posted date and time" for storing date and time at which the message was posted. Note that it is possible to further provide a column of "No. (number)". In such as case, (i) an identification number is assigned, for convenience, to one (1) record in order to uniquely specify one (1) message and (ii) the identification number is stored in the column of "No.".

The conversation monitoring section 21 monitors the table of the conversation log illustrated in FIG. 3. Specifically, the conversation monitoring section 21 can specify, with reference to the column of speaker, members who are participating in the currently established conversation. In the example illustrated in FIG. 3, it is possible to specify the members participating in the conversation as "Taro and Mother".

The conversation monitoring section 21 further monitors, with reference to the column of comment message, whether or not a specific keyword or a combination of specific keywords has been posted. In a case where, for example, (i) the specific keyword to be detected is set to "homework" in advance and (ii) a message to which an identification number of "4" is assigned is registered in the table of the conversation log, the conversation monitoring section 21 can detect that a message containing the keyword "homework" has been posted.

In a case where (i) specific members (e.g., "Taro and Mother") is participating in a conversation and (ii) the conversation monitoring section 21 has detected that a specific keyword or a combination of specific keywords (e.g., "homework") has been posted, the conversation monitoring section 21 notifies the status information collecting section 22 of the detected specific members "Taro and Mother" and the detected specific keyword "homework".

[Comment Rule and Status Information]

FIG. 4 is a view illustrating a data structure and a concrete example of a comment rule stored in the comment rule storing section 31.

The comment rule is information for specifying a comment message which is to be posted by the agent server 1 (cleaner robot 5). According to the present embodiment, the comment message is specified under the combination of the following three conditions. That is, (1) which member is participating in a conversation, (2) which keyword has been posted in the conversation, and (3) what status an event is being in, inside or outside the community.

In the example illustrated in FIG. 4, the condition (1) of participating member is specified in a column of "member" in the comment rule. The condition (2) of keyword is specified in a column of "keyword". The condition (3) of event of community is specified in a column of "event".

In the table of the comment rule, "comment message" is stored so as to be associated with "member", "keyword", and "event".

That is, by specifying (i) "member" participating in an established conversation, (ii) "keyword" in a message, and (iii) "event" derived from collected status information, the comment making section 24 can specify, with reference to the comment rule illustrated in FIG. 4, a comment message to be outputted to the family message board server 2.

As above described, a specific "member" participating in a conversation and a specific "keyword" posted in the conversation are specified by the conversation monitoring section 21. The conversation monitoring section 21 monitors a conversation based on a combination of (i) information stored in the column of "member" and (ii) information stored in the column of "keyword".

Meanwhile, an "event" inside or outside the community is specified by the status judging section 23. Here, in order for the status judging section 23 to specify an "event", the status information collecting section 22 first collects designated status information from a designated information source.

In the table of the comment rule illustrated in FIG. 4, a column of "information source" for storing source information is provided so that the information sources are associated with respective combinations of "member" and "keyword". The source information is information that designates (i) status information to be collected when a specific keyword or a combination of specific keywords has appeared in a conversation in which a specific member or a combination of specific members is participating and (ii) a location at which the status information is stored.

In a case where, for example, "Mother" is participating in a conversation and the conversation monitoring section 21 has detected that one of the members has posted a keyword "milk" in the conversation, the status information collecting section 22 obtains, with reference to the table of the comment rule illustrated in FIG. 4, source information "refrigerator stock information (home server)" corresponding to the member "Mother" and the keyword "milk". The source information designates that the status information "refrigerator stock information" stored in the storage location "home server 3" is obtained. The status information collecting section 22 obtains refrigerator stock information from the home server 3 in accordance with the source information. In the example illustrated in FIG. 4, a name of status information and a name of a server are described in the column of "information source". In practice, a pass name (e.g., Uniform Resource Locator (URL)) or a file name for reaching intended status information is stored in a format which can be read by the status information collecting section 22.

FIG. 5 is a view illustrating a data structure and a concrete example of refrigerator stock information obtained by the status information collecting section 22 from the home server 3.

The refrigerator stock information, which is status information, has at least a column of "article" and a column of "stock".

In the column of "article", various articles (mainly, foodstuffs) are stored which are assumed to be stocked in the refrigerator that belongs to the community (in this case, the family illustrated in FIG. 2). In the column of "stock", information indicative of whether or not each article is currently stocked in the refrigerator 8 is stored.

The status judging section 23 first refers to a column of "extraction item" which is provided in association with the combination of "member" and "keyword" in the comment rule table illustrated in FIG. 4. In the column of "extraction item" in the comment rule, a necessary item to be extracted from status information is defined. The status judging section 23 can specify an event inside or outside the community by extracting, in accordance with information stored in the column of "extraction item", an item in relation with a content of a conversation out of collected pieces of status information.

For example, in the table illustrated in FIG. 4, information "article=milk, stock" is stored in association with the member "Mother" and the keyword "milk". This indicates that an item of "stock" for "article=milk" is extracted from obtained refrigerator stock information.

The status judging section 23 can extract, in accordance with the extraction item, information of "stock=none" in a record for "article=milk" from the table of refrigerator stock information illustrated in FIG. 5. As a result, an event of the refrigerator 8 can be determined as "stock (of milk)=none". The status judging section 23 specifies the event "stock=none", which is derived from the extracted item, as a condition for retrieving a comment message. The status judging section 23 notifies the comment making section 24 of the specified event "stock=none".

As above described, the comment making section 24 specifies a "comment message" that conforms to the specified "member", "keyword", and "event". In the example illustrated in FIG. 4, the comment making section 24 can specify, as a comment message to be outputted, a comment message "Milk has run out!" which is associated with the member "Mother", the keyword "milk", and the event "stock=none". The comment making section 24 transmits the comment message to the family message board server 2. This allows the comment message "Milk has run out!" to be displayed, as a comment made by the cleaner robot 5, on the mobile terminals 4 of the respective members participating in a conversation. Consequently, this makes it possible to let the cleaner robot 5 participate in the conversation which is established between Mother and the other member(s).

Furthermore, the comment regarding milk is outputted in accordance with actual circumstances in the refrigerator 8 when the keyword "milk" appears in the conversation carried out between Mother and the other member(s).

As such, since the comment is made which reflects the actual circumstances of the community, a natural flow of conversation is not disturbed. On the contrary, the actual circumstances of the community are notified, by the agent server 1 (on behalf of cleaner robot 5), to the members participating in the conversation, and therefore the member can continue the conversation based on the notified actual circumstances. For example, on the basis of the situation in which milk has run out, a conversation begins in regard to obtaining milk.

As such, the agent server 1 makes a comment while taking into consideration a status in relation to the community, and it is therefore possible (i) to facilitate the communications between the members and accordingly (ii) to maintain a good condition of the community (in this case, in particular, the refrigerator 8).

Examples of the status information encompass local retail store information and calendar information, in addition to the refrigerator stock information illustrated in FIG. 5. Note, however, that the status information is not limited to those. FIG. 6 and FIG. 7 illustrate examples of the status information.

FIG. 6 is a view illustrating a data structure and a concrete example of local retail store information obtained by the status information collecting section 22 from the information supplying server 3a.

The local retail store information has at least a column of "store name", a column of "advertised article", and a column of "price".

In the column of "store name", a store name of a store such as a supermarket to which the family members often go is registered in advance. In the column of "advertised article", a bargain article is stored which is set by the registered store. In the column of "price", a selling price of the article is stored. The pieces of information of bargain articles and their prices are periodically set by registered stores. Therefore, the status information collecting section 22 (i) constantly obtains latest bargain sale information from websites (i.e., the information supplying servers 3a, 3b, 3c, and so forth) of the registered stores, and then (ii) prepares a table of local retail store information illustrated in FIG. 6. Alternatively, it is possible to employ a configuration in which the status information collecting section 22 obtains the table itself illustrated in FIG. 6 from the information supplying server 3a that carries out a service of (i) preparing such a table by collecting pieces of bargain sale information and (ii) supplying the table.

By analyzing the local retail store information, the status judging section 23 can specify an event indicative of which store sells which article at what price in a bargain sale. This allows the comment making section 24 to give information regarding a bargain sale at a natural timing in a case where the family members talk about a specific article to be purchased.

FIG. 7 is a view illustrating a data structure and a concrete example of calendar information obtained by the status information collecting section 22 from the home server 3.

The calendar information has at least a column of "date" indicative of a date on which a plan is carried out, a column of "member" indicative of a performer to carry out the plan, and a column of "plan" indicative of a content of the plan to be carried out.

The table of calendar information is prepared by, for example, any of the members who registers a schedule with the use of a device such as the PC 9. For example, in a case where Father inputs a plan of playing golf on September 1st, the PC 9 accesses a table of calendar information saved in the home server 3 and registers (i) "Father", who is to carry out the plan, in the column of "member" and (ii) a plan "golf" in the column of "plan", as a record for "September 1st" in the column of "date".

By analyzing the calendar information, the status judging section 23 can specify an event indicative of who is planning to do what and when. This allows the comment making section 24 to give information regarding plans of the family members at a natural timing in a case where the family members talk about their plans.

In addition to the pieces of information illustrated in the drawings, the status information collecting section 22 can collect status information such as weather forecast information and pool facility information from the information supplying servers 3a, 3b, 3c, and so forth via the Internet. In a case where the status judging section 23 analyzes weather forecast information and accordingly specifies predicted weather in an area which is talked about, the comment making section 24 can make a comment on predicted weather on a date on which the family members go out, in a case where the family members talk about an outing. In a case where the status judging section 23 analyzes pool facility information and accordingly specifies open hours of an interested pool facility, the comment making section 24 can make a comment regarding the open hours of the pool facility in a case where the family members talk about going to the pool facility.

As above described, the status judging section 23 can specify an event inside or outside the community by analyzing various status information in relation to the community (family). Consequently, the comment making section 24 can make a comment in accordance with the event inside or outside the community.

[Comment Making Flow—Scene 1: Conversation Between Mother and Child]

The following description will discuss a flow of processes carried out by the agent server 1, with reference to a flowchart and a drawing illustrating a screen example. Here, the process flow is described based on an example illustrated in FIG. 9.

Figure 8:
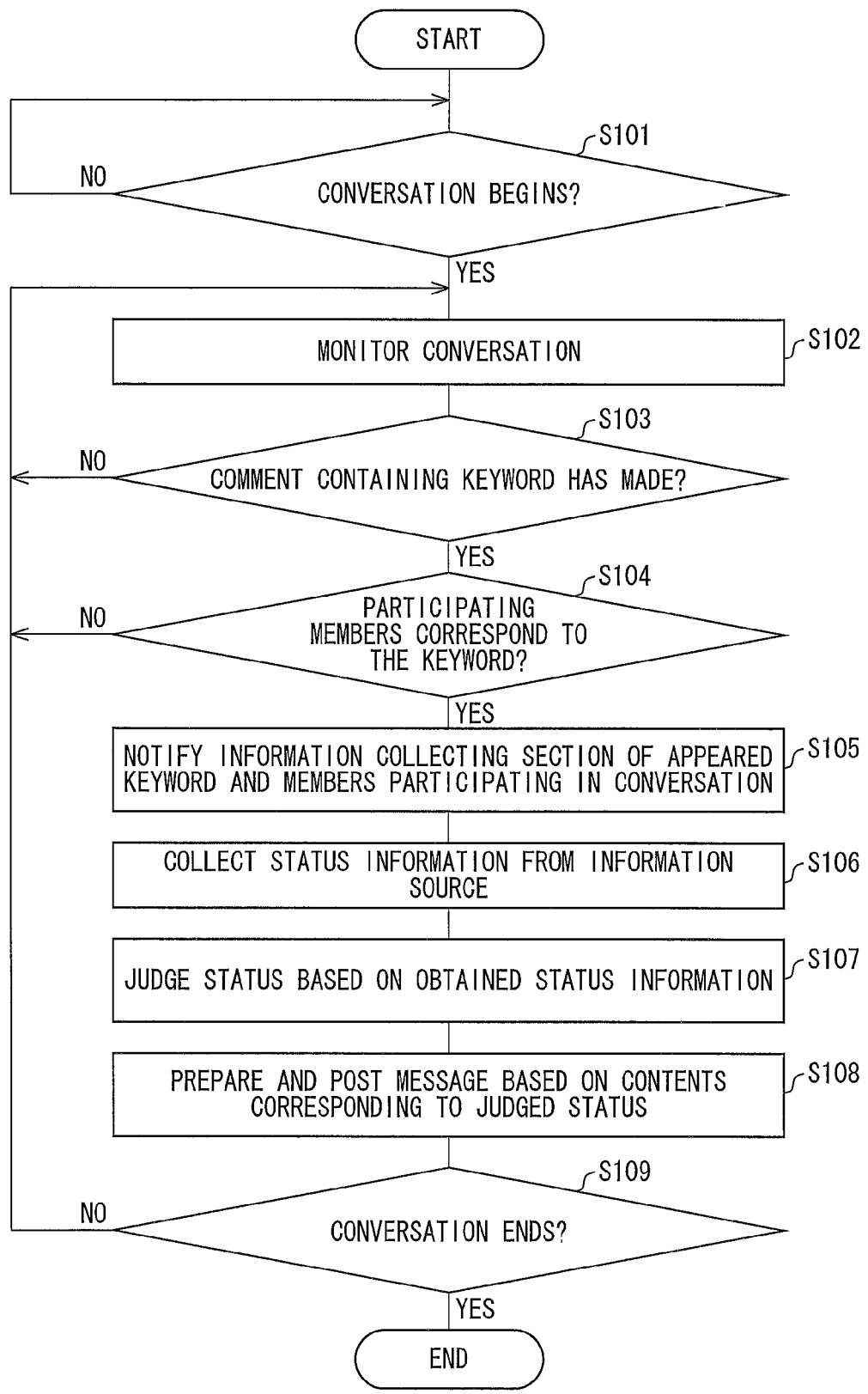
FIG. 8 is a flowchart illustrating a flow of processes carried out by an agent server.

FIG. 8 is a flowchart illustrating a flow of processes carried out by the agent server 1 which makes a comment on behalf of the cleaner robot 5.

(a) through (c) of FIG. 9 illustrates screen examples of the family message board displayed on the mobile terminal 4 of each of the members in a case where the agent server 1 (cleaner robot 5) participates in a conversation between the members.

In a case where any of the members posts a message on the family message board with the use of the mobile terminal 4, the family message board server 2 registers the message and notifies the mobile terminals 4 of the respective members of the family message board on which the message has been reflected. A conversation thus begins (S101). For example, a message is displayed on the mobile terminals 4 which message is posted by Taro (child), who has just come home, for notifying Father and Mother, who are out, of the fact that Taro has just come home (see (a) of FIG. 9).

In a case where the conversation log obtaining section 20 detects that a conversation has begun (YES in S101), the conversation monitoring section 21 monitors the conversation between the family members with reference to a conversation log obtained by the conversation log obtaining section 20 (S102). While the keyword, which is designated by the comment rule illustrated in FIG. 4, does not appear (NO in S103), the monitoring is continued and the conversation, which has begun from the message posted by Taro, goes on between Mother and Taro (see (a) of FIG. 9). Then, it is assumed that Mother posts a message "Have you finished homework?" at a certain timing.

As illustrated in FIG. 4, the term "homework" is designated as a keyword in the comment rule. In this case, the conversation monitoring section 21 detects that the keyword "homework" has been posted (YES in S103). Subsequently, the conversation monitoring section 21 specifies, with reference to a conversation log stored in the conversation log storing section 30, "Mother and Taro" as the members participating in the conversation illustrated in (a) of FIG. 9. In a case where there is no record in which the keyword "homework" is associated with the members "Mother and Taro" in the comment rule (NO in S104), the conversation monitoring section 21 (i) determines that there is no comment to be made by the cleaner robot 5 at the time and (ii) continues to monitor the conversation.

On the other hand, in a case where there is a record in which the keyword "homework" and the members "Mother and Taro" are associated with each other as illustrated in FIG. 4 (YES in S104), the conversation monitoring section 21 notifies the status information collecting section 22 of the detected keyword "homework" and the members "Mother and Taro" who are participating in the conversation (S105).

The status information collecting section 22 collects, with reference to the comment rule, designated status information from an information source associated with the detected keyword and the participating members (S106). In the example illustrated in FIG. 4, calendar information in the home server 3 is associated with the keyword "homework" and the members "Mother and Taro". Therefore, the status information collecting section 22 obtains the calendar information (see FIG. 7) from the home server 3.

Subsequently, the status judging section 23 analyzes the obtained status information (i.e., calendar information) so as to judge a status of the community (S107). In this case, the status judging section 23 specifies an event that relates to a plan of the family in relation to homework. The following description will discuss an example of how the status judging section 23 specifies an event.

The status judging section 23 reads out an extraction item "member=Taro, plan=*homework*, date" which is associated, in the comment rule, with the detected keyword "homework" and members "Mother and Taro". The extraction item designates that (i) the performer of the plan is "Taro" in the column of "member" in the calendar information, (ii) a record including "homework" (i.e., partially matches) in the column of "plan" is extracted, and (iii) information of date stored in the column of "date" in the record is extracted.

The status judging section 23 extracts, as designated, date of the record, in which the member is "Taro" and the plan includes the keyword "homework", from the calendar information illustrated in FIG. 7. In the example illustrated in FIG. 7, the status judging section 23 extracts the record on September 7th. This allows the status judging section 23 to determine that "Taro has a plan on September 7th in relation to homework". The status judging section 23 notifies the comment making section 24 of the specified event "there is a plan relating to homework on 'date'".

Note that, according to the present embodiment, the part 'date' to which the quotation marks (' ') are added in the columns of event and comment message (see FIG. 4) is to be substituted by a date which has been actually extracted from the column of date in the calendar information and has been dynamically determined. As such, in the comment rule table, events and comment messages can be stored which are written in a template containing the quotation marks (' ') so as to achieve versatility in the correspondence between "event" and "comment message".

In a case where the specified "event" is written in the template containing the quotation marks, the status judging section 23 notifies the comment making section 24 of the template and a content of an actually extracted item. Specifically, the status judging section 23 notifies the comment making section 24 of the specified event "there is a plan relating to homework on 'date'" and information "date=September 7th".

Lastly, the comment making section 24 posts a message to the family message board server 2 in accordance with a status of the community which status has been judged by the status judging section 23 (S108).

Specifically, the comment making section 24 receives, from the status judging section 23, the event "there is a plan relating to homework on 'date'" and the information "date=September 7th". Then, with reference to the comment rule, the comment making section 24 reads out, from the column of "comment message", a comment message which is associated with the "keyword" specified by the conversation monitoring section 21, the "member" participating in the conversation, and the "event" received from the status judging section 23. In the example illustrated in FIG. 4, the comment making section 24 obtains the comment message "The homework should be done by 'date'!".

In a case where an obtained comment message is written in a template containing quotation marks (i.e., the obtained comment message is incompletely written), the comment making section 24 completes the comment message by substituting a part, to which the quotation marks are added in the template, by an actual value extracted by the status judging section 23. In this case, the comment making section 24 embeds "date=September 7th" into the template "The homework should be done by 'date'!" so as to prepare a comment message "The homework should be done by September 7th!". The comment making section 24 posts the comment message, which has been thus completed, to the family message board server 2.

As such, the message "The homework should be done by September 7th!" from the cleaner robot 5 is reflected on the family message board after the message "Have you finished homework?" from Mother so as to be viewed via the mobile terminals 4 (see (b) of FIG. 9).

Note that, in a case where an obtained comment message is not written in the template containing quotation marks, the comment making section 24 can output, as a completed message, the obtained comment message as it is to the family message board server 2. For example, in a case where the comment making section 24 has read out a comment message "Milk has run out!" from the comment rule, the comment making section 24 posts the message as it is to the family message board server 2.

Even after the comment making section 24 has posted the message, the conversation monitoring section 21 continues to monitor the conversation until the conversation ends (NO in S109). Note that an end of conversation can be detected by the conversation monitoring section 21 when, for example, no massage is posted from any of the members during a predetermined time period.

As such, the agent server 1 posts, on behalf of the cleaner robot 5, the message that (i) reflects the plan (i.e., an event in the community) of Taro belonging to the community and (ii) has been selected by taking into consideration (a) the members participating in the conversation and (b) the keyword which appears in the conversation. This allows the agent server 1 to naturally and automatically post a message that is suitable for (i) a flow of conversation carried out between members and (ii) an actual circumstance of the community.

This allows the members to continue the conversation while keeping the flow of the conversation, based on the message posted by the cleaner robot 5 (actually, the agent server 1). For example, the members, who knew the actual circumstance of the community based on the comment made by the cleaner robot 5, can make any proposal or discussion in order to improve the status of the community or to maintain the good condition, as illustrated in (c) of FIG. 9.

As such, the agent server 1 makes a comment while taking into consideration the situation relating to the community, and this makes it possible to (i) facilitate communications between the members and accordingly (ii) maintain a good condition of the community (in this case, in particular, the schedule of the family).

[Another Comment Making Flow—Scene 2: Conversation Between Father and Mother]

The following description will discuss another scene of making comments, with reference to a drawing illustrating another example screen.

Figure 10:
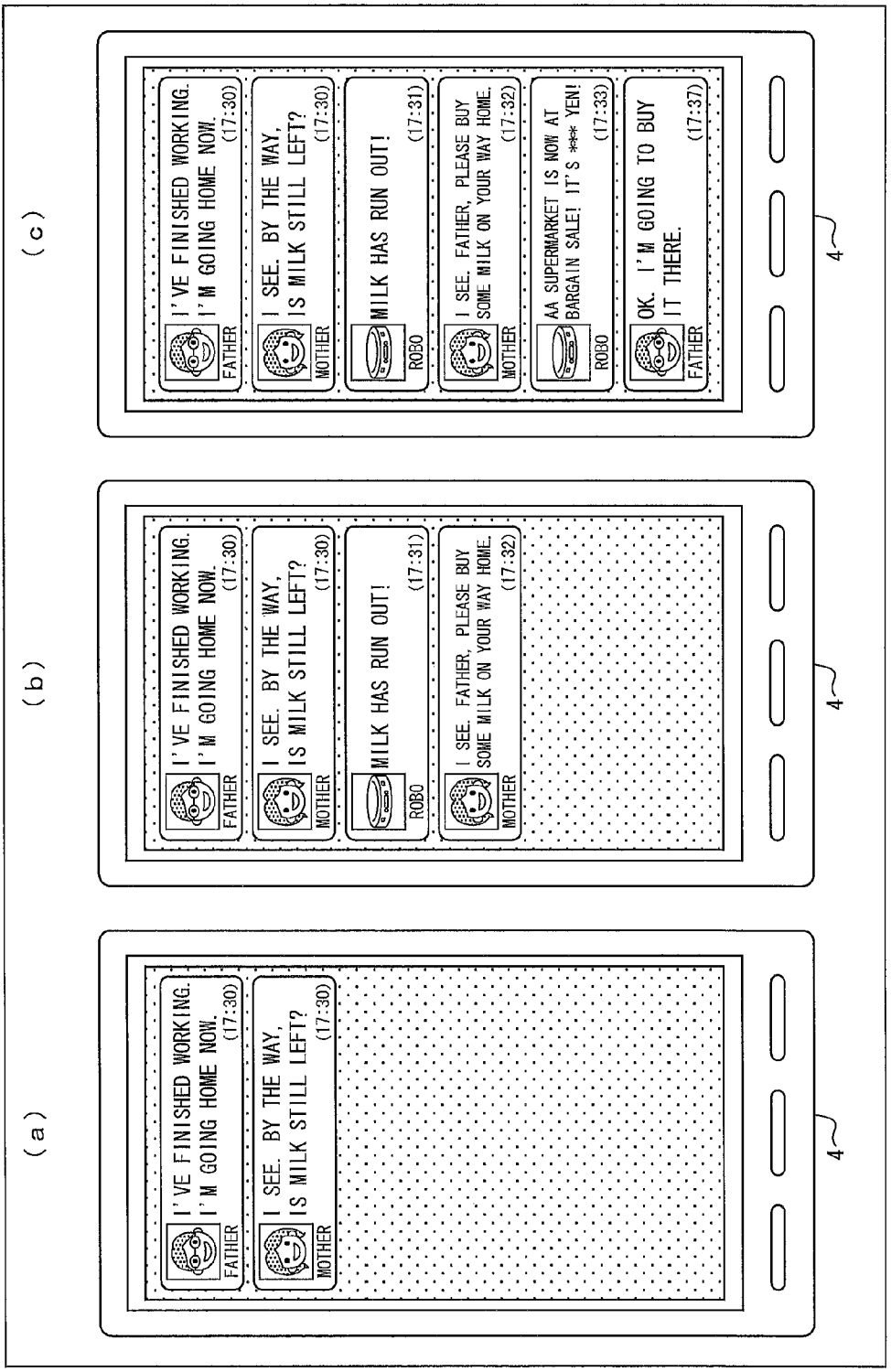
FIG. 10 is a view illustrating, in each of (a) through (c), another example screen of a family message board which is displayed on a mobile terminal of each member in a case where an agent server participates in a conversation.

FIG. 10 is a view illustrating, in each of (a) through (c), another example screen of the family message board which is displayed on the mobile terminal 4 of each of the members in a case where the agent server 1 (i.e., the cleaner robot 5) participates in a conversation.

In the example illustrated in FIG. 10, Father and Mother are both at respective working places, and a conversation begins when Father notifies, via the family message board, the family members of the fact that Father has just finished working and is going home.

In this example, Mother posts a message concerning a stock of milk, following the message from Father (see (a) of FIG. 10). At this time, the conversation log obtaining section 20 registers the comment message, which contains the keyword "milk" associated with the speaker "Mother", in the table of conversation log (see FIG. 3).

This allows the conversation monitoring section 21 to detect a specific "member" and a specific "keyword". Specifically, the conversation monitoring section 21 detects that the keyword "milk" is contained in a posted message in a case where members participating in the conversation are "Father and Mother".

According to the present embodiment, the member "Mother" designated in the table of comment rule illustrated in FIG. 4 indicates that the condition is met provided that at least "Mother" is included in participants of a conversation, and the other members are not excluded. Similarly, "Mother and Taro" in the column of "member" indicates that the condition is met provided that at least "Mother" and "Taro" are included in participants of a conversation.

Therefore, when Mother posts a message as illustrated in (a) of FIG. 10, the conversation monitoring section 21 detects that the specific keyword "milk" has appeared in a conversation while the specific member "Mother" is participating in the conversation. The conversation monitoring section 21 notifies the status information collecting section 22 of the specific member "Mother" and the specific keyword "milk".

The status information collecting section 22 collects, with reference to the comment rule (illustrated in FIG. 4), designated status information (i.e., refrigerator stock information) from a designated information source (i.e., the home server 3) which is associated with the member "Mother" and the keyword "milk".

With reference to the comment rule, the status judging section 23 (i) extracts a record, in which an article is milk, and (ii) obtains an item of stock from refrigerator stock information illustrated in FIG. 5 in accordance with the designated extraction item "article=milk, stock" which is associated with the member "Mother" and the keyword "milk". In the example illustrated in FIG. 5, the stock of milk is "none". In this case, therefore, the status judging section 23 specifies the event "stock (of milk)=none" with regard to the refrigerator 8.

The comment making section 24 specifies, with reference to the comment rule, a comment message as "Milk has run out!" based on the member "Mother", the keyword "milk", and the event "stock=none". The comment message is a completed comment message that does not contain quotation marks, and the comment making section 24 therefore transmits, to the family message board server 2, the comment message as it is, which has been obtained from the comment rule storing section 31.

As such, the agent server 1 posts the comment message, which relates to the stock of milk, on the family message board, and the comment message is reflected on the screen of each of the mobile terminals 4 as illustrated in (b) of FIG. 10.

As illustrated in (b) of FIG. 10, the members can further continue the conversation based on the comment message posted by the agent server 1 (i.e., the cleaner robot 5 for the members). In this case, the cleaner robot 5 has announced that no milk is stocked in the refrigerator 8, and accordingly, for example, Mother can post, based on the information from the cleaner robot 5, a message for asking Father to buy milk.

At this time, the conversation monitoring section 21 detects that a keyword "buy" has been additionally posted. The conversation monitoring section 21 notifies, based on the comment rule, the status information collecting section 22 of the member "Mother" and a keyword "milk and buy" this time.

In this case, the status information collecting section 22 collects local retail store information illustrated in FIG. 6 from the information supplying server 3a.

The status judging section 23 extracts a record, in which an advertised article is milk, from the table of local retail store information illustrated in FIG. 6, based on an extraction item "advertised article=milk, store name, price", and obtains items of the store name and the price in the record. In the example illustrated in FIG. 6, the status judging section 23 (i) extracts a record in which the advertised article is set to milk and (ii) obtains, from the record, an item "store name=AA supermarket" and an item "price=*** yen".

The status judging section 23 can judge a status of an external environment relating to the community based on information extracted from the local retail store information. Specifically, the status judging section 23 can specify an "event" that (i) there is a local retail store which currently sells milk at a bargain price, (ii) the store is "AA supermarket", and (iii) a selling price is "*** yen".

The status judging section 23 notifies the comment making section 24 of an event "there is a store at bargain sale of milk" and the extracted items "store name=AA supermarket" and "price=*** yen".

The comment making section 24 reads out, from the comment rule, a comment message "'store name' is now at bargain sale! It's 'price'!" based on the member "Mother", the keyword "milk and buy", and the event "there is a store at bargain sale of milk".

In this case, the read out comment message is written in an incomplete template containing quotation marks. Therefore, the comment making section 24 completes the comment message by embedding "store name=AA supermarket" and "price=*** yen", which are obtained from the status judging section 23, into 'store name' and 'price', respectively.

As such, a comment message "AA supermarket is now at bargain sale! It's *** yen!" prepared by the comment making section 24 is outputted to the family message board server 2. Then, as illustrated in (c) of FIG. 10, the comment message is posted so as to be viewed via the screens of the mobile terminals 4 of the respective members.

As illustrated in (c) of FIG. 10, the members can further post messages based on the message newly posted from the cleaner robot 5. In the example illustrated in (c) of FIG. 10, a conversation for solving the lack of stock of milk in the refrigerator 8 is facilitated between the members, and the message posted by the agent server 1 triggers an improvement in the status of the community.

Note that, in the example illustrated in (c) of FIG. 10, the keyword "buy" appears twice. If the cleaner robot 5 makes the same message every time the keyword "buy" appears, the flow of the conversation may become unnatural and therefore the original conversation between the members may be disturbed. In order to avoid such a case, the conversation monitoring section 21 of the present embodiment is configured not to detect a repeatedly appeared identical keyword.

Alternatively, it is possible to employ a configuration in which detection of each keyword is resumed in a case where the keyword appears not less than the number of times which is set in advance. For example, in a case where the number "×3" is stored in the comment rule so as to be associated with the keyword "milk", the conversation monitoring section 21 can detect the keyword "milk" again, provided that (i) the conversation monitoring section 21 has detected the keyword "milk" twice in the conversation after detecting the keyword "milk" for the first time and then (ii) the keyword "milk" appears for the third time.

Modification Example

According to the example above described, the agent server 1 is configured to make a comment on behalf of the cleaner robot 5. Alternatively, it is possible that (i) the other household appliances, which are provided in the house, are dealt with as respective personified appliances and (ii) the agent server 1 makes comments on behalf of the household appliances. For example, in a case where the information source is refrigerator stock information and the agent server 1 makes a comment regarding an event of the refrigerator 8, the agent server 1 can output a comment message as a character of the refrigerator 8. Alternatively, in a case where the information source is calendar information and the agent server 1 makes a comment regarding a plan of the family, the agent server 1 can output a comment message as a character of the PC 9.

Each functional block for the agent server 1 to process a comment can be provided in each of the personified appliances (e.g., the cleaner robot 5). In such a case, it is possible to employ a configuration in which the family message board server 2 accepts comment messages from the personified appliances as if the comment messages are posted to the family message board by characters of the respective personified appliances.

In the above description, the example is described in which quotation marks are contained in the events and the comment messages in order to enhance versatility of the comment rule. Further, in order to enhance versatility of the comment rule, quotation marks can be contained in the keywords and the extraction items. For example, in the example illustrated in FIG. 4, a keyword "pool and 'date'" is designated as a keyword to be detected. This designates that a case is detected in which a keyword "pool" and a term specifying a date appear in a conversation. The conversation monitoring section 21 can detect that a term specifying a date has appeared by detecting a term such as "numeral+year", "numeral+month", "numeral+day", "tomorrow", "yesterday", "day after tomorrow", "next week", or "next Sunday". Moreover, "weather on 'date'" is designated as an extraction item in the same record. The status judging section 23 interprets the extraction item "weather on 'date'" by inserting an actual date, which can be specified from a term detected by the conversation monitoring section 21, into the part 'date'. In a case where, for example, a member posts a message "I'm looking forward to the pool tomorrow!" on August 1st, the status judging section 23 interprets an extraction item as "weather on August 2nd", based on information obtained from the conversation log, i.e., the information of "posted date and time" (i.e., August 1st) and the term "tomorrow" detected by the conversation monitoring section 21. The status judging section 23 can thus extract the information on the weather on August 2nd from collected pieces of weather forecast information.

In the example above described, the local retail store information illustrated in FIG. 6 is the table containing the information on bargain articles. Note, however, that the local retail store information is not limited to the table containing the information on bargain articles and can be a table which contains, for each article designated in advance by a member, a store name, at which the article is sold, so that the store name is associated with a price. In this case, the status judging section 23 can extract, for example, a price of a specific article (e.g., milk) for each store, and it is therefore possible to specify a store at which the specific article is sold at a lowest price. The status judging section 23 can specify an event "lowest 'price' of milk, 'store name'". In the table of comment rule, a comment message such as "Milk at 'store name' is the cheapest! It's 'price'!" can be stored so that the comment message is associated with the event. According to the configuration, in a case where the members talk about buying milk, the agent server 1 can notify the members of information on the lowest price of milk via the family message board.

The agent server 1 described above indicates (i) functional modules for carrying out specific functions or (ii) a logical combination of a plurality of devices, and it is not important whether or not the functional modules or the devices are provided in a single housing.

The functional modules (functional blocks) for serving as the agent server 1 and storage sections such as the conversation log storing section 30 and the comment rule storing section 31 can be configured by cloud computing.

[Main Points]

In order to attain the object, the comment processing device in accordance with an aspect of the present invention includes: a conversation monitoring unit configured to monitor comments, which are made by members belonging to a community, by obtaining a conversation log from a conversation mediation server that mediates a conversation carried out by the members with use of a communication terminal device; a status information collecting unit configured to collect status information, which (i) indicates an event relating to the community and (ii) is designated by being associated with a specific member and a specific keyword, in a case where the conversation monitoring unit has detected that the specific keyword has appeared in a conversation in which the specific member participates; and a comment making unit configured to output, to the conversation mediation server, a comment message which conforms to an event that (i) relates to the community and (ii) is indicated by status information collected by the status information collecting unit.

In order to attain the object, the comment processing method in accordance with an aspect of the present invention is a method for processing a comment carried out by a comment processing device, the method including the steps of: monitoring comments, which are made by members belonging to a community, by obtaining a conversation log from a conversation mediation server that mediates a conversation carried out by the members with use of a communication terminal device; collecting status information, which (i) indicates an event relating to the community and (ii) is designated by being associated with a specific member and a specific keyword, in a case where it is detected, in the step of monitoring comments, that the specific keyword has appeared in a conversation in which the specific member participates; and outputting, to the conversation mediation server, a comment message which conforms to an event that (i) relates to the community and (ii) is indicated by status information collected in the step of collecting status information.

First, the members belonging to the community can have a conversation with each other with the use of their respective communication terminal devices by utilizing a service (electronic conversation tool) provided by the conversation mediation server. The conversation mediation server which mediates the conversation stores a conversation log of the conversation.

According to the configuration of the comment processing device and the comment processing method of the present invention, the conversation monitoring unit (i) specifies members, who are participating in a conversation, based on the conversation log and (ii) monitors which keyword appears in the conversation.

Then, the conversation monitoring unit detects that the specific keyword has appeared in a conversation in which the specific member is participating. In this case, the status information collecting unit collects status information which is designated in advance by being associated with the specific member and the specific keyword which have been detected. The status information indicates an event relating to the community to which the members, who are participating in the conversation, belong. That is, the event relating to the community can be identified by obtaining the status information relating to the specific member or the specific keyword.

Then, the comment making unit outputs, to the conversation mediation server, a comment message that conforms to the event indicated by the collected status information.

The comment message outputted from the comment making unit is thus posted, as a comment made by the comment processing device, in the conversation carried out between the members.

As such, the comment processing device posts the comment that (i) reflects an event relating to the community and (ii) has been selected by taking into consideration (a) the members participating in the conversation and (b) the keyword which appears in the conversation. This allows the comment processing device to naturally make a comment that is suitable for (i) a flow of conversation carried out between the members and (ii) an actual circumstance of the community to which the members, having the conversation, belong.

This allows the members to continue the conversation while keeping the flow of the conversation, based on the comment made by the comment processing device. For example, the members, who knew the actual circumstance of the community based on contents of the comment made by the comment processing device, can make proposals or continue discussion in order to improve the status of the community or to maintain a good condition.

As such, the comment processing device makes a comment while taking into consideration the situation relating to the community, and this makes it possible to (i) facilitate communications between the members and accordingly (ii) maintain a good condition of the community.

The comment processing device in accordance with an aspect of the present invention can further include: a comment rule storing section configured to store a comment message which (i) is associated with the specific member, the specific keyword, and the event and (ii) is posted by the comment processing device which is serving as a member of the community, the comment making unit (i) reading out, from the comment rule storing section, a comment message which is stored so as to be associated with the specific member and the specific keyword which have been detected by the conversation monitoring unit and with the event indicated by the status information collected by the status information collecting unit and then (ii) outputting the comment message to the conversation mediation server.

According to the configuration, the comment making unit can immediately read out and obtain, from the comment rule storing section, a comment to be made, provided that (1) members participating in a conversation are specified by the conversation monitoring unit, (2) a specific keyword or a combination of specific keywords, which appears in the conversation, is detected by the conversation monitoring unit, and (3) an event relating to the community is identified based on status information collected by the status information collecting unit.

According to the comment processing device in accordance with an aspect of the present invention, it is preferable that a comment message stored in the comment rule storing section contains a template in which a message is partially incomplete; and, in a case where a comment message, which corresponds to an event indicated by status information collected by the status information collecting unit, contains the template, the comment making unit inserts a part of the status information into the template so as to complete the comment message.

According to the configuration, the comment making unit can dynamically determine a content of the comment message by editing the content in accordance with contents of collected status information, as well as uniquely determine the content of the comment message in accordance with participating members, an appeared keyword, and an event.

This makes it possible to further diversify, in accordance with a status of the community, contents of comments made by the comment processing device. This allows the comment processing device to make a comment, more naturally, which is suitable for an actual circumstance of the community.

It is preferable that the comment processing device in accordance with an aspect of the present invention further includes: a status judging unit configured to specify an event, which relates to the community, by analyzing status information collected by the status information collecting unit, the status judging unit specifying the event by extracting, from the status information, an item which relates to the specific member or the specific keyword which has been detected by the conversation monitoring unit, and the comment making unit outputting, to the conversation mediation server, a comment message which conforms to the event specified by the status judging unit.

According to the configuration, the status judging unit extracts, from the status information, an item relating to the specific member or the specific keyword so as to determine an event relating to the community based on the extracted item. That is, the comment processing device can grasp an event of the community with regard to an item which is closely related to the members participating in the conversation or to a keyword appearing in the conversation.

The content of the comment message, which is selected in correspondence with the event thus specified, is suitable for an actual circumstance of the community and is posted more naturally.

According to the comment processing device in accordance with an aspect of the present invention, it is possible that the status information is information indicative of an occur event of things belonging to the community; and the status information collecting unit obtains the status information from a home server which belongs to the community.

According to the configuration, the occur event of things belonging to the community is identified, and this allows the comment processing device to make a comment which relates to the event occurring inside the community to which the members belong.

Although not limited to this, in a case where the community is a family, the comment processing device can make comments which relate to any kinds of events that occur in a house of the family. Consequently, it is possible to facilitate communications between the family members and accordingly to maintain a good condition in the house.

According to the comment processing device in accordance with an aspect of the present invention, it is possible that the status information is information indicative of an occur event of an external environment relating to the community; and the status information collecting unit obtains the status information from at least one information supplying server which is connected with the comment processing device via the Internet.

According to the configuration, the occur event of the external environment surrounding the community is identified, and therefore the comment processing device can make a comment which relates to the event in the external environment which somehow influences the community to which the members belong.

Although not limited to this, in a case where the community is a family, the comment processing device can make a comment which relates to (i) an area in which the family members are interested and (ii) any kinds of events that occur in the external environment which influences the family. Consequently, it is possible (i) to facilitate communications between the family members and accordingly (ii) to maintain a good condition in the house.

Note that the comment processing device can be realized by a computer. In such a case, the present invention encompasses (i) a control program of the comment processing device which control program causes the computer to serve as the above described units for realizing the comment processing device and (ii) a computer-readable storage medium storing the control program.

The present invention is not limited to the aforementioned embodiments and is susceptible of various changes within the scope of the accompanying claims. That is, embodiments obtained by suitable combinations of technical means modified within the scope of the accompanying claims are also included within the technical scope of the present invention.

[Example of Configuration Achieved by Software]

Lastly, each block of the agent server 1, in particular, the conversation log obtaining section 20, the conversation monitoring section 21, the status information collecting section 22, the status judging section 23, and the comment making section 24 can be configured by hardware with the use of a logic circuit formed on an integrated circuit (IC chip) or by software with the use of CPU (Central Processing Unit).

In the case of being configured by software, the agent server 1 includes a CPU, a ROM (Read Only Memory), a RAM (Random Access Memory), and a storage device (storage medium) such as a memory. The CPU executes instructions of programs for realizing the functions. In the ROM, the programs are stored. Into the RAM, the programs are loaded. In the storage device, the programs and various data are stored. The objective of the present invention can also be achieved, by (i) supplying a storage medium, in which program codes (executable programs, intermediate code programs, source programs) of programs for controlling the agent server 1 configured by software for realizing the functions, are stored so that a computer can read them, to the agent server 1, and then (ii) causing the computer (or CPU or MPU) to read and execute the program codes stored in the storage medium.

The storage medium can be a non-transitory tangible medium, e.g., a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; a semiconductor memory such as a mask ROM, EPROM, EEPROM (Registered Trademark), or flash ROM; or a logic circuit such as PLD (Programmable Logic Device) or FPGA (Field Programmable Gate Array).

Alternatively, the agent server 1 can be arranged to be connectable to a communications network so that the program codes are delivered over the communications network. The communications network is not limited to a specific one, provided that the program codes can be transferred via the communications network. The communications network can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific configuration or a specific type, provided that the program codes can be transferred via the transfer medium. The transfer medium can be, for example, wired line such as IEEE 1394, USB, electric power line, cable TV line, telephone line, or ADSL (Asymmetric Digital Subscriber Line) line; or wireless such as infrared radiation (IrDA, remote control), Bluetooth (Registered Trademark), IEEE 802.11 wireless, HDR (High Data Rate), NFC (Near Field Communication), DLNA (Digital Living Network Alliance), mobile telephone network, satellite line, or terrestrial digital network. Note that, the present invention can be realized by a computer data signal (i) which is realized by electronic transmission of the program code and (ii) which is embedded in a carrier wave.

The present invention is not limited to the embodiments, but can be altered by a skilled person in the art within the scope of the claims. An embodiment derived from a proper combination of technical means disclosed in respective different embodiments is also encompassed in the technical scope of the present invention. Further, it is possible to form a new technical feature by combining the technical means disclosed in the respective embodiments.

INDUSTRIAL APPLICABILITY

The comment processing device of the present invention is widely applicable to various communication systems in which a community is formed by utilizing an electronic conversation tool so that members belonging to the community can communicate with each other.

REFERENCE SIGNS LIST

1: Agent server
2: Family message board server (conversation mediation server)
3: Home server
3a: Information supplying server
4a through 4c: Mobile terminal (communication terminal device)
5: Cleaner robot (personified appliance/household appliance)
6: Air conditioner (household appliance)
7: Lighting device (household appliance)
8: Refrigerator (household appliance)
9: PC (household appliance)
10: Control section
11: Communication section
12: Storage section
20: Conversation log obtaining section (conversation log obtaining unit)
21: Conversation monitoring section (conversation monitoring unit)
22: Status information collecting section (status information collecting unit)
23: Status judging section (status judging unit)
24: Comment making section (comment making unit)
30: Conversation log storing section (conversation log storing section)
31: Comment rule storing section (comment rule storing section)
100: Family message board system (communication system)

The invention claimed is:

1. An agent server for providing communication between a personified agent and one or more human members participating in a community comprising:
 a communication unit that communicates With external devices via a communications network;
 a memory that stores status information received from the external devices; and
 a controller configured to:
  store at least one specific key word and at least one event relating to the community in association with each of the members or each combination of the members;
  monitor posts, which are made by members belonging to the community, by obtaining a conversation to from a conversation mediation server that mediates a conversation carried out by the members with use of a communication terminal device;
  collect, in a case where monitoring posts detects that one of the stored keywords has appeared in a member conversation and the detected keyword is associated with each of the member or each combination of the members participating in the conversation, status information, which (i) indicates an event relating to the community and (ii) is designated by being associated with the detected specific keyword;
  create a character by personifying one of the external devices thereby allowing the members of the community to experience a simulated communication with the external device; and
  post a message as the character, to the conversation mediation server which conforms to an event that (i) is associated with each of the members or each combination of the members participating in the conversation and (ii) is indicated by the collected status information.

2. An agent server as set forth in claim 1, wherein the the memory further stores a comment message which (i) is associated with the event indicated by the collected status information and (ii) is posted by said personified agent which is serving as a member of the community, and
 wherein the controller is further configured to
 (i) read out, from the memory, a comment message which is stored so as to be associated with the event indicated by the collected status information and then (ii) output the comment message to the conversation mediation server.

3. An agent server as set forth in claim 2, wherein:
 a comment message stored in memory contains a template in which a message is partially incomplete; and
 in a case where a comment message, which corresponds to an event indicated by collected status information, contains the template, the controller inserts a part of the status information into the template so as to complete the comment message.

4. An agent server as set forth in claim 1, wherein the controller is further configured to:
 specify an event, relates to the community, by analyzing collected status information,
 the controller specifying the event by extracting, from the status information, an item which relates to the specific member or the specific keyword which has been detected by the controller, and
 output, to the conversation mediation server, a comment message which conforms to the specified event.

5. The agent server as set forth in claim 1, wherein:
 the status information is information indicative of an occur event of things belonging to the community; and
 the controller obtains the status information from a home server which belongs to community.

6. The agent server as set forth in claim 1, wherein:
 the status information is information indicative of an occur event of an external environment relating to the community; and
 the controller obtains the status information from at least one information supplying server which is connected with said comment processing device via the Internet.

7. A method for providing communication between a personified agent and one or more human members participating in a community, said method comprising the steps of:
 creating a character by personifying an external device associated with the community thereby allowing the members of the community to experience a simulated communication with the external device;
 monitoring, by an agent server, posts, which are made by members belonging to a community, by obtaining a conversation log from a conversation mediation server that mediates a conversation carried out by the members with use of a communication terminal device;
 collecting, by the agent server, in a case where monitoring posts detects that at least one specific keyword which is stored in a comment rule so as to be associated with each of the members or each combination of the members has appeared in a member conversation and the detected keyword is associated with the members or each combination of the members participating in the conversation, status information which (i) indicates an event relating to the community and (ii) is designated by being associated with the detected specific keyword; and
 posting a message as the character, to the conversation mediation server which conforms to an event that (i) is associated with each of the members or each combination of the members participating in the conversation and (ii) is indicated by the collected status information.

8. A non-transitory computer-readable storage medium which stores a control program for causing a processor to perform the steps of claim 7.

* * * * *